United States Patent

[11] 3,600,841

[72] Inventor Gonzalo O. Catan, Jr.
2628 Alfonso St., Singalong Manila, Philippines
[21] Appl. No. 731,533
[22] Filed May 23, 1968
[45] Patented Aug. 24, 1971

[54] ANIMAL TRAP
2 Claims, 3 Drawing Figs.

[52] U.S. Cl. ................................................. 43/68
[51] Int. Cl. ............................................ A01m 23/10
[50] Field of Search ................................. 43/68, 67, 69, 71

[56] References Cited
UNITED STATES PATENTS
74,759  2/1868  Huffman ................. 43/68
1,052,293  2/1913  Thompson ................. 43/68

Primary Examiner—Warner H. Camp

ABSTRACT: A cage has upstanding walls provided with a pair of opposed holes. A balanced tubular member is pivotally mounted within the cage and is normally directed in line with the pair of opposed holes. The tubular member has an opening at the lower side thereof closed by a balanced cover member pivotally mounted on supports within the cage. A transverse wall within the cage is parallel to the tubular member and has an opening, towards which, the opening on the tubular member leads upon tilting of the tubular member and a downwardly slanting flexible barrier, the upper end of which, is secured to the transverse wall immediately above the opening therein, the lower side of said flexible barrier having pins to prevent rodents from going back through the opening on the transverse wall.

PATENTED AUG24 1971 3,600,841
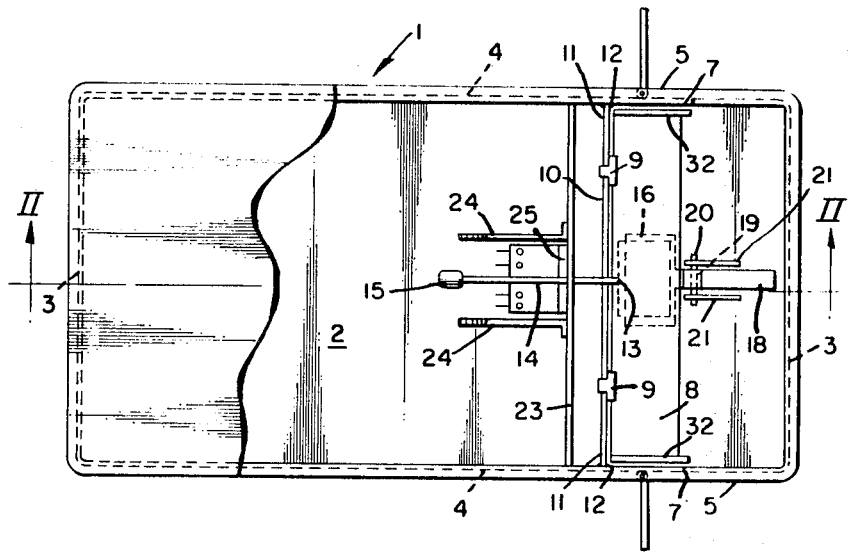
FIG.1
FIG.2
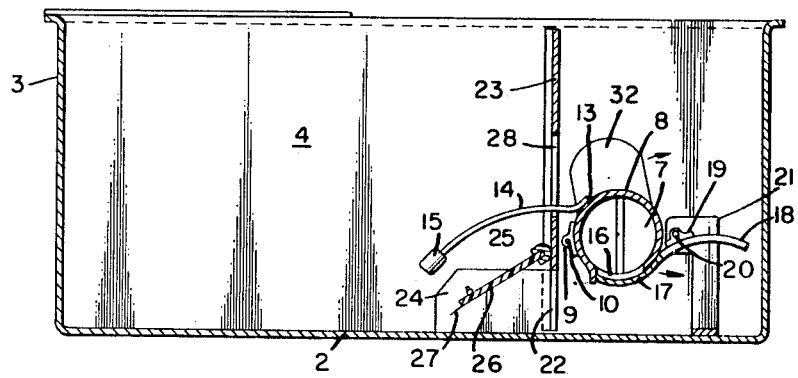
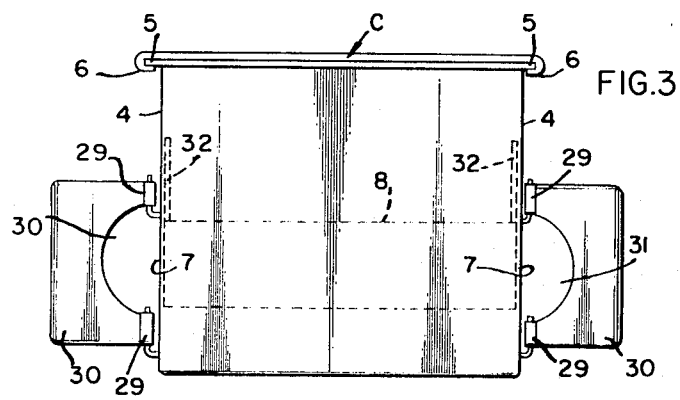
FIG.3
*INVENTOR.*
GONZALO O. CATAN, JR

ANIMAL TRAP

The present invention relates to traps in general and more particularly to an animal trap.

While this invention could be used to trap various kinds of animals, it is however, designed specifically to catch rodents which have been observed to have certain peculiar habits. One of the peculiar habits of rodents is their tendency to enter holes and other constricted passages. Rodents, however, have also been observed to be very observant and are easily frightened by noise or movements of objects.

With the above, observations, it is therefore the object of this invention to provide a trap which will take advantage of the habit of rodents to enter holes or constricted passages.

It is also an object of this invention to provide a trap which will not create noise or movement which would scare a rodent away until the rodent has entered a portion of a constricted passage where it could no longer back out.

Another object of this invention is to provide a trap having a tiltable balanced conduit or tubular member which when tilted to expose an opening thereon automatically effects the closure of the entry holes or opening leading into the cage where further devices are provided to prevent the escape of the trapped rodents.

Still another object of this invention is to provide a trap which is capable of catching a number of rodents without any personal attendance.

It is further object of this invention to provide a trap which is simple, inexpensive and easy to manufacture.

Other objects will become apparent from the following description of the accompanying drawings forming part of this specification wherein:

FIG. 1 is a top view of the animal trap embodying the present invention with portions of the slidable cover thereof cutaway to show the parts within the cage.

FIG. 2 is a cross-sectional view taken along line II—II of FIG. 1.

FIG. 3 is a left end view of the animal trap with the outline of the tubular member shown in dotted lines.

Referring now to the drawings, the animal or rodent trap in accordance with the present invention, includes a boxlike rectangular cage 1 having a bottom wall 2, upstanding end walls 3 and upstanding sidewalls 4. The upper edges 5 of the sidewalls 4 are flanged horizontally outwardly to receive the inwardly bent edges 6 of the slidable cover C which is shown clearly in FIG. 3.

While, as shown in the drawings the cage is made of sheet metal, any suitable material, such as plastic or wood may be used.

On the sidewalls 4 and close to the bottom are the opposed openings 7. Positioned within the cage and in line with the opposed openings is the tubular member 8 which is open at both ends. The tubular member is pivotally connected by the hinges 9 to the rod 10 and the ends 11 of which are soldered at 12 to the sidewalls 4.

Soldered to the tubular member at 13 is an arcuate rod 14 at the free end of which is counterweight 15. The counterweight is adapted to balance the tubular member 8 and maintain the same normally in line with the opposed openings 7 on the sidewalls 4.

On the lower side of the tubular member 8 is an opening 16 which is normally closed by a balanced arcuate cover member 17 which has a tail portion 18 pivoted at 19 on the rod 20 the ends of which are secured to the spaced-apart supports 21. At the ends of the tubular member are the plates 32 adapted to close substantially the openings 7 upon tilting of the tubular member.

The cover member 17 is adapted to be pushed or tilted downwardly by a downward force such as the weight of a rodent. Upon tilting of the cover member, the opening 16 in the tubular member is uncovered and due also to the weight of the rodent (within the tubular member) the tubular member tilts or rotates on its pivot in a downwardly direction until the fully uncovered opening 16 thereon is aligned with the opening 22 at the bottom of the transverse wall 23. The vertical sides of the transverse wall 23 are soldered to the sidewalls of the cage. Secured to the transverse wall 23 close to the vertical sides of the opening 22 are the upstanding guide plates 24. Secured also to the transverse wall 23 directly above the opening 22 is the channel clip 25 which holds the upper end of the flexible barrier 26 which as shown clearly in FIG. 2, is downwardly slanting. At the free or lower end of the flexible barrier 26 are secured the pointed rods 27 which could be ordinary pins. The pointed rods or pins 27 are adapted to prick rodents attempting to back through the opening 22.

So that the arcuate rod 14 would be free to move up and down, a vertical elongated slot 28 is provided on the transverse wall 23. On the outer sides of the sidewalls 4 are pivotally mounted at 29 the baffles 30 which have semicircular cuts 31. The baffles 30 are made of sheet metal and are formed substantially as shown in FIG. 3. Baffles 30 are adapted to guide the rodents through the openings 7 into the tubular member. It has been observed that rodents attracted by baits placed within the cage move along the sides of cage. With the baffles 30 on the way as the rodents hug the sides of the cage, the rodents are forced to enter the openings 7.

Various modifications may be made by those skilled in the art on the exemplary embodiment described without departing from the essence of the invention as defined in the appended claims.

I claim:

1. An animal trap including a cage, opposed upstanding walls of which, has a pair of opposed in-line openings; a tiltable tubular member pivotally positioned within said cage and normally in line with said opposed openings, said tubular member having an opening at the lower side thereof and end plates to substantially cover said opposed openings in said cage walls upon tilting of said tubular member; a tiltable cover member pivotally positioned within said cage normally covering the lower opening in said tubular member; a transverse wall positioned within said cage close to said tubular member, said transverse wall having an opening substantially coinciding with the lower opening in said tubular member upon tilting of said tubular member; a pair of guide plates extending from the vertical sides of the opening on said transverse wall away from the tubular member; and a downwardly inclined flexible baffle the upper end of which is secured to said transverse wall directly above said opening on said transverse wall, said flexible baffle having pointed rods secured at the free end thereof.

2. An animal trap as claimed in claim 1 having baffles pivotally mounted on the outer side of each of the opposed upstanding sidewalls of said cage, said baffles being positioned diametrically across the openings on said sidewalls.